April 11, 1967 W. W. WEESE 3,313,312
THERMALLY RESPONSIVE ACTUATOR DEVICES
Filed Jan. 24, 1964 2 Sheets-Sheet 1

INVENTOR.
WILFRED W. WEESE
BY
Burns, Doane, Benedict, Swecker & Mathis
ATTORNEYS April 11, 1967 W. W. WEESE 3,313,312
THERMALLY RESPONSIVE ACTUATOR DEVICES
Filed Jan. 24, 1964 2 Sheets-Sheet 2

INVENTOR.
WILFRED W. WEESE
BY
Burns, Doane, Benedict, Swecker & Mathis
ATTORNEYS

United States Patent Office

3,313,312
Patented Apr. 11, 1967

3,313,312
THERMALLY RESPONSIVE ACTUATOR DEVICES
Wilfred W. Weese, Flushing, N.Y., assignor to
Harry Swartz, New York, N.Y.
Filed Jan. 24, 1964, Ser. No. 339,974
8 Claims. (Cl. 137—75)

This invention relates to actuator devices of the thermally responsive type. In particular it relates to uniquely resettable, liquid-flow control mechanisms.

In many instances it is desirable to make the actuation of devices such as switches, valves, and alarms, etc., dependent upon ambient temperature conditions. In order to effect such thermally responsive control, a variety of actuator devices have heretofore been provided.

Many previously utilized, thermally responsive actuator devices include operating components maintained in tension over sustained periods of time. Such devices are often vulnerable to the effects of metal creep and metal fatigue to such an extent as to have erratic performance characteristics. Obviously the failure of such devices to respond in a consistently positive and reliable fashion endangers or renders unsafe the item of equipment with which they are associated in a control capacity.

An additional problem attributable to previously known thermally responsive control devices involves structural complexity with its attendant fabrication and maintenance expense.

Particularly severe problems have related to areas where control devices were required to be immersed in a liquid, the temperature of which was to be measured for control purposes. The immersed character of such devices has introduced serious problems with respect to the provision of a successful resetting or reactuation mechanism.

Recognizing the present need for an improved, thermally responsive actuator, it is an object of the present invention to provide such devices which substantially obviate drawbacks of previously known structures such as those described above.

It is a particular object of the invention to provide a thermally responsive control device which is not vulnerable to metal creep or metal fatigue and which is consistently positive and reliable in its response.

A further object of the invention is to provide such an actuator which is conveniently resettable even by unskilled personnel.

Yet another object of the invention is to provide such an actuator which may be readily employed as a thermally responsive control device immersed in a liquid body, the temperature of which is being monitored.

It is also an object of the invention to provide an improved, thermally responsive actuator which, although structurally simple in character, is uniquely reliable in performance characteristics.

In accomplishing the foregoing objectives, an apparatus is provided which includes cylinder means, piston means, and a mass of solidified, fusible material. The cylinder means and piston means are assembled so as to define in axially consecutive relationship a first, variable-size cavity, restricted passage means, and a second, variable-size cavity. The mass of solidified, fusible material is supported within the cylinder means in one of the aforesaid cavities.

Operating means, operatively associate with the aforesaid piston means, causes the piston means to compressively engage the mass of fusible material.

Mounting means support the cylinder means such that, when the mass has melted and become liquid in response to an ambient temperature rise and the thus-formed liquid has at least in part moved from one of the cavities through the restricted passage means and into said other of the cavities, and resolidified therein, the cylinder means and piston means assembly may be reoriented to cause the piston means to compressively engage the resolidified mass in the other of the cavities.

In a preferred embodiment, the actuator is employed as a liquid-flow-control device. The cylinder means is supported within a housing cavity for rotation about an axis transverse of the cylinder means axis. Yoke means are connected to the piston means and engage the piston means at opposite ends of the cylinder means. Operating means, comprising a rod extending from a spring-biased check valve, engage the yoke means so as to exert a biasing force against the piston means tending to compress the hardened, fusible mass. In this liquid-flow-control embodiment of the invention, the cylinder means and piston means assembly is adapted to be oriented so as to cause the yoke means to be so disposed as to hold the rod in a position supporting the check valve in an open position.

In describing the invention, reference will be made to preferred embodiments shown in the application drawings.

In these drawings:

FIGURE 1 provides a plan view illustrating one side of one form of a liquid-flow-control device incorporating novel aspects of this invention;

Figure 1:
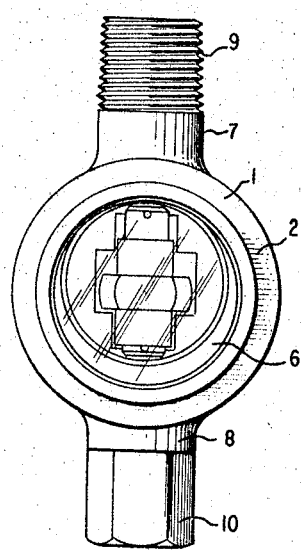
Figure 2:
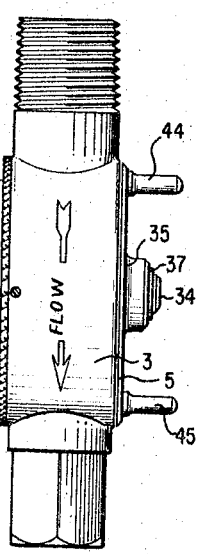
FIGURE 2 is an edge view of the device shown in FIGURE 1.

The device 1 shown in FIGURE 1 is adapted to control the flow of a liquid which may be water. When liquid flowing through this device attains a particular temperature, the flow of the water is interrupted. Thus, this device has particular utility in applications such as controlling the flow of hot water to a shower head.

As shown in FIGURES 1 through 7, the thermally responsive device 1 comprises a housing 2 including a cylindrical wall portion 3 and front and rear wall portions 4 and 5, respectively. Wall portions 4 and 5 are axially spaced with reference to the axis of cylindrical wall portion 3 and extend generally radially of wall portion 3 so as to define, in combination with wall 3, a central cavity 6.

Housing 2 includes a liquid inlet wall 7 and a liquid outlet wall 8. As shown in FIGURE 1, inlet wall 7 may include an externally threaded coupling portion 9. Similarly, outlet wall 8 may include a conventional, internally threaded coupling portion 10. By means of coupling portions 9 and 10, housing 2 may be connected in a conventional fashion in a conduit line, such as a line leading to a shower head.

As illustrated, inlet wall 7 and outlet wall 8 may both be generally cylindrical in character and coaxially aligned.

Inlet wall 7 defines an inlet passage 11 which intersects cylindrical wall 3 so as to communicate with the central housing cavity 6. In a similar fashion, outlet wall 8 defines an outlet passage 12 which also intersects cylindrical wall 3 to communicate with the central housing cavity 6.

Figure 4:
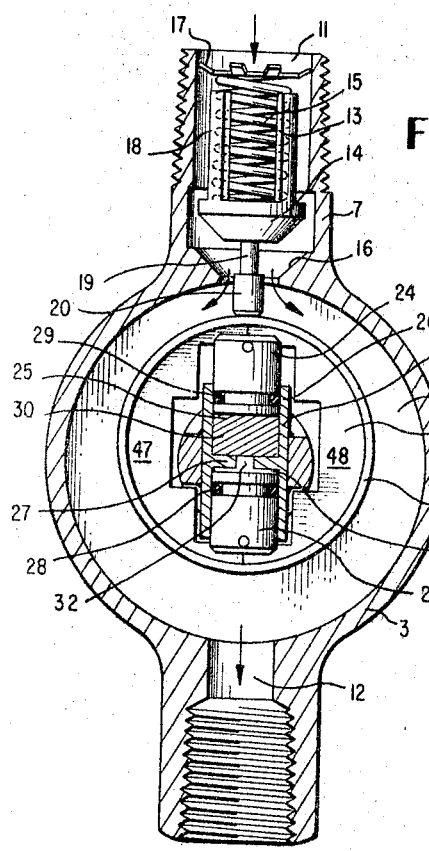
FIGURE 4 is an enlarged, sectional view of the apparatus shown in FIGURE 1 illustrating the arrangement of internal components while liquid flow is taking place.
Figure 5:
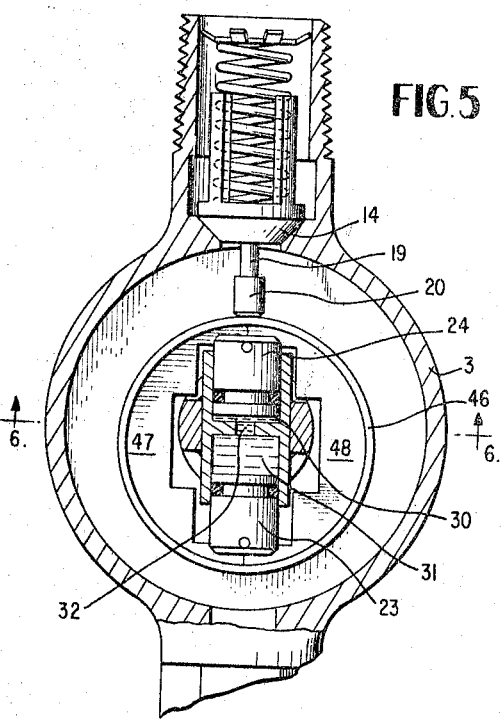
FIGURE 5 is an enlarged, sectional view of the FIGURE 1 apparatus illustrating the internal apparatus components when the flow of liquid has been interrupted in response to a liquid temperature rise.

A check valve assembly 13 is mounted within inlet passage 11 as shown in FIGURES 4 and 5. Valve assembly 13 comprises a check valve 14 urged by a conventional coil spring 15 toward the central cavity 6. A valve seat 16, formed in housing 2 within passage 11, cooperates with the spring-biased valve 14 so as to seal the passage 11 when the valve 14 is in engagement with the seat 16.

As further shown in FIGURES 4 and 5, a conventional lock washer, or similar structure 17 may be positioned within the passage 11 to lockingly engage the wall 7 so as to restrain the coil spring 15 and hold it in biasing engagement with the valve 14. The valve 14 may be stabilized with reference to the coil spring 15 by means such as the illustrated aligning fingers 18.

An operating rod 19 extends axially away from the valve 14 in coaxial relationship with the passages 11 and 12. Rod 19 projects from the valve 14 into the central housing cavity 6, as shown. Operating rod 19 may be provided with an enlarged bearing end 20 which slidably engages an actuator assembly 21, the details of which will now be described.

Actuator assembly 21 includes, as its major components, a cylinder 22, piston means which in the FIGURE 4 embodiment comprise a first piston 23 and a second piston 24, and a mass of hardened, or solidified, fusible material 25. Mass 25 may be composed of a low-melting-point, metallic alloy such as several well-known, bismuth, lead, tin, or antimony alloys. As shown in FIGURE 4, cylinder 22 includes a cylindrical wall 26 and a centrally positioned, radially extending, and centrally and axially apertured, transverse wall 27.

Pistons 23 and 24 are assembled with cylinder 22 so as to lie on opposite sides of transverse wall 27. Pistons 23 and 24 may be provided with gaskets such as conventional O-rings 28 and 29 to insure the establishment of proper sealing relationship between the pistons and the cylindrical wall 26.

When the actuator assembly 21 is initially assembled, the mass 25 may comprise a rod-like segment of a low-melting-point alloy which is disposed adjacent one side of wall 27 within what may be designated a first cylinder cavity 30, which cavity 30 also contains at least a portion of the piston 24. The other piston 23 is assembled within what may be designated as a second cylinder cavity 31.

As will now be apparent, pistons 23 and 24, cylinder 22, and fusible mass 25 are so assembled as to define, in axially consecutive relationship with reference to the cylinder 22, a first cavity 30, a restricted passage defined by transverse wall aperture 32, and a second cavity 31.

Figure 6:
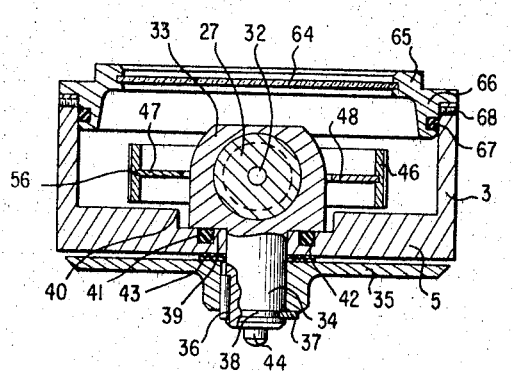
FIGURE 6 is a transverse, sectional view of the FIGURE 1 device as viewed along the section line 6—6 of FIGURE 5.

As shown in FIGURES 4, 5, and 6, cylinder 22 is mounted for rotational movement within the housing 2. This mounting is achieved by means of a mounting sleeve 33 which may be rigidly secured to the outer periphery of the cylindrical wall 26 by means such as brazing or soldering.

The mounting arrangement for cylinder 22 further includes a spindle 34 connected to sleeve 33 and extending through housing wall 5 as shown in FIGURE 6.

Spindle 34 is journaled within wall 5 in coaxial relationship with the cylindrical axis of housing wall 3. Spindle 34 may be secured in wall 5 by a handle plate 35. Handle plate 35 may be attached to spindle 34 by a conventional key 36. A lock ring 37 mounted in an annular groove 38 on the extremity of spindle 34 serves to secure the handle plate 35.

An unusually effective, fluid-tight seal between the spindle 34 and the housing wall 5 may be achieved by a flat bearing face 39 which is formed on the sleeve 33 and engages an annular bearing face 40 formed in housing wall 5. As illustrated, bearing face 39 sealingly engages a gasket such as O-ring 41 which is mounted within an annular recess 42.

An additional seal comprising thin plastic discs 43 may be interposed between the handle plate 35 and the wall 5.

As will be appreciated, the O-ring 41 and the discs 43, in addition to forming seals between the spindle 34, sleeve 33, and housing wall 5, also serve to facilitate the rotation of the spindle 34 in response to manual manipulation of the handle plate 35. Such manual manipulation may be accomplished by grasping the handle pins or knobs 44 and 45 and rotating the plate 35 about the axis of the spindle 34 so as to transmit rotational movement to the cylinder 22.

An effective connection between the cylinder and piston assembly which uniquely facilitates the resetting of the actuator 21 is illustrated in FIGURES 4, 5, 6, and 7.

This connection comprises yoke means including an annular, cylindrical ring 46. As shown, ring 46 is mounted with its axis generally parallel to the cylindrical axis of housing wall 3 and peripherally encircles the piston and cylinder assembly.

Figure 7:
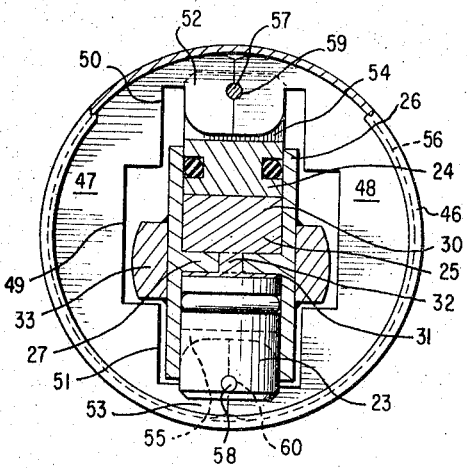
FIGURE 7 is a further-enlarged, partially sectioned, and fragmentary view of an actuator assembly portion of the FIGURE 1 apparatus which includes a cylinder means and piston means assembly as well as yoke means connected with the piston means.

Annular ring 46 is connected to pistons 23 and 24 by means including a pair of connecting plates 47 and 48. As shown in FIGURE 7, connecting plate 47 has a central, relatively deep, lateral recess 49 adapted to accommodate the cylinder-mounting sleeve 33 and allow for movement of the sleeve radially of the ring 46. Connecting plate 47 also includes less deep lateral recessed portions 50 and 51 which accommodate the cylinder wall 26 and allow for radial movement of the cylinder wall 26 relative to the ring 46. The ends of generally semi-cylindrical plate 47 include a pair of generally inwardly and radially extending connecting flanges 52 and 53.

As will be apparent by reference to FIGURE 7, semi-cylindrical connecting plate 48 is fabricated so as to bear a mirror-image relationship with respect to the connecting plate 47.

The assembly of connecting plates 47 and 48 with the piston and cylinder assembly may be accomplished by moving the connecting flanges 52 and 53 of plate 47 and the corresponding connecting flanges of the connecting plate 48 into end slots 54 and 55 of pistons 24 and 23 respectively. With these plate flanges abutting within the piston solts as shown in FIGURE 7, the plates 47 and 48 may be driven axially into the annular ring 46 until they are received in locked relationship within an annularly extending, plate-locking groove 56. With the plates thus locked in position within the groove 56, connecting pins 57 and 58 may be passed respectively through apertures of pistons 24 and 23 to intersect and become locked with the plates 48 and 47. This locking action may be achieved by allowing the pins 57 and 58 to pass through flange edge recesses which cooperate to define circular flange apertures 59 and 60 as shown in FIGURE 7.

The actuator assembly 21 shown in enlarged detail in FIGURE 7, would enable the pistons 23 and 24 to telescope freely within the cylinder cavities 30 and 31 were it not for the solidified, fusible mass 25 which is mounted within one of the cylinder cavities 30 or 31. As shown in FIGURE 7, fusible mass 25, when in cavity 30, displaces the piston 24 outwardly of this cavity and, by means of the connecting plates 47 and 48, holds the piston 23 in its innermost position within the cavity 31.

As illustrated in FIGURE 4, the actuator assembly 21 is positioned within the cavity 6 such that the enlarged end 20 of the operating rod 19 slidingly engages the outer periphery of the annular ring 46. With the actuator assembly positioned as shown in FIGURE 4, such that the solidified mass 25 is interposed between the restricted passage 32 and the operating rod 19, the ring 46 is disposed so as to hold the rod 19 in an outwardly displaced position which supports the spring-biased valve 14 in an open position.

With the apparatus components disposed as shown in FIGURE 4, water may enter the inlet passage 11, flow around the actuator assembly 21 through the central cavity 6, and exit through the outlet 12. As this point, the cylinder cavity 31 is substantially or fully occupied by the piston 23 while the cavity 30 is occupied partially by the mass 25 and partially by the piston 24.

Actuator assembly 21 is immersed within liquid passing through the central cavity 6 such that this fluid determines its ambient temperature condition. When the temperature of the liquid surrounding the actuator assembly 21 rises to a point where it equals or exceeds the melting point of the hardened, fusible mass 25, this mass melts and becomes liquid. The biasing force applied by the spring-biased rod 19 transmitted through the ring 46 and connecting plates 47 and 48 to the piston 24 tends to force melted liquid through the restricted passage 32 and into the cylinder cavity 31. As the piston 24 advances into the cylinder cavity 31, displacing the melted material, the connecting plates 47 and 48 transmit this displacing movement to the piston 23. Thus, the piston 23 moves out of the cavity 31 while the piston 24 moves into the cylinder cavity 30 so that as cylinder cavity 31 progressively enlarges, cylinder cavity 30 progressively diminishes in size. As will be appreciated, the movement of the piston 23 out of the cavity 31 will tend to form a vacuum within cavity 31 so as to further facilitate the movement of melted material from the cavity 30 to the cavity 31.

When the melted material has been at least partially displaced from the cavity 30 into the cavity 31, the ring 46 will have moved generally axially of the passages 11 and 12 and in a direction toward the outlet passage 12. The operating rod 19 will have moved toward the cavity 6 to a sufficient extent to allow the valve 14 to engage the valve seat 16 and thus close the water inlet 11. Thus, in response to a rise in ambient temperature, the actuator assembly 21 will function to cause the valve 14 to interrupt the flow of liquid through the device 1.

The positions of the actuator assembly components and the valve 14 after this flow interruption has occurred are shown in FIGURE 5.

The closing of the valve 14 may be accomplished by only a partial displacement of melted material from the cavity 30 into the cavity 31. Thus as shown in FIGURE 5, seating of the valve 14 may take place even though some melted material remains within the cavity 30 and occupies the restricted passage 32. Melted material may be allowed to solidify in these locations; as shown, for example, in FIGURE 7.

After the melted material has resolidified within the cavity 31, the handles 44 and 45 may be grasped and turned so as to rotate the actuator assembly 21 180° about the axis of the spindle 34. With the thus resulting reversal of the positions of pistons 23 annd 24, the hardened, fusible mass will again be placed between the restricted passage 32 and the rod 19, but will this time lie within the cylinder cavity 31.

As will be appreciated, the reorientation of the actuator assembly 21 will again displace the operating rod 19 so as to hold the valve 14 in an open position and allow the resumption of liquid flow.

Figure 3:
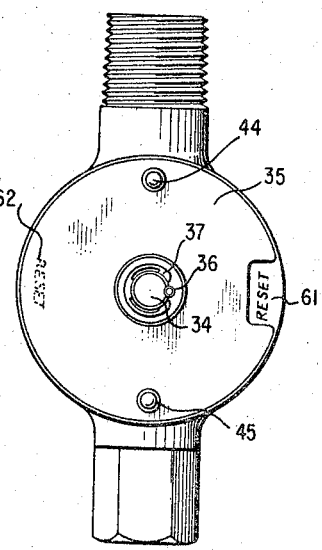
FIGURE 3 is a plan view showing the side of the FIGURE 1 device opposite to that illustrated in FIGURE 1.

The resetting of the actuator assembly 21 may be facilitated by utilizing marking indicia 61 and 62 formed on the outer surface of the housing plate 5 as shown in FIGURE 3. A notched portion 63 of the handle plate 35 may cooperate with the indicia 61 and 62 to define the proper setting positions of the actuator assembly 21 in an obvious fashion.

Under certain circumstances, it may be desirable to observe the interior of the housing 2. Where this is desirable, the housing wall 4 may be defined by a transparent plate 64 which is mounted within an annular rim 65 as shown in FIGURE 6. Rim 65 may have a portion 66 provided with an O-ring-type sealing gasket 67, which portion telescopingly extends into the cavity 6 in mating engagement wtih the cylindrical wall 3. Rim 65 may be positively secured to the cylindrical wall 3 by means such as set screws 68 as shown in FIGURE 6.

Figure 8:
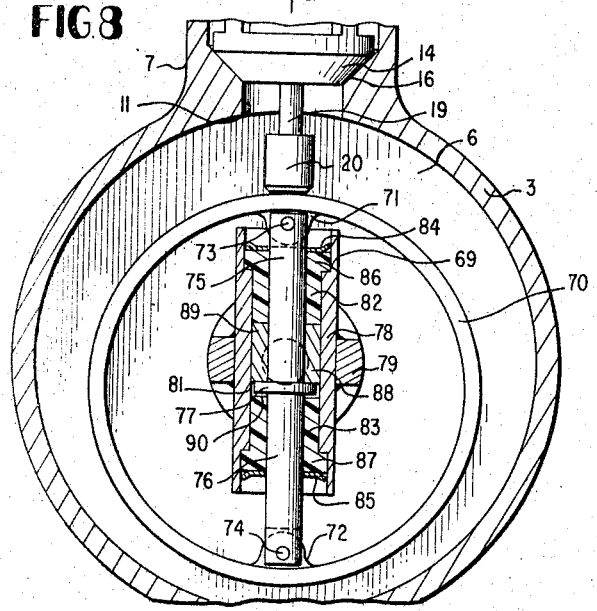
FIGURE 8 is an enlarged, partially sectioned illustration of an alternative embodiment of the FIGURE 4 arrangement.
Figure 9:
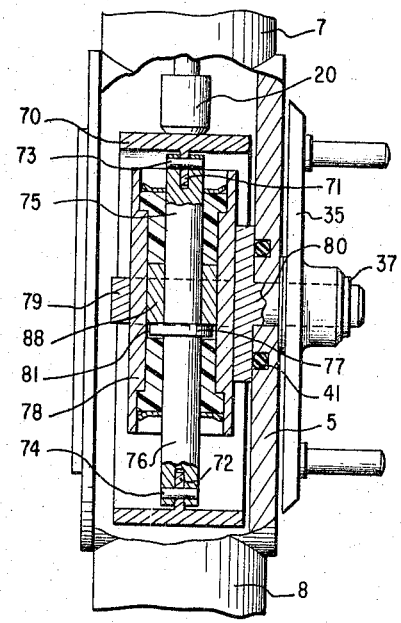
FIGURE 9 is a partially sectioned, and fragmentary view of the FIGURE 8 alternative embodiment as viewed along the section line 9—9.

FIGURES 8 and 9 illustrate an actuator assembly 69 which differs somewhat from the actuator embodiment 21 shown in FIGURES 4 through 7.

Actuator assembly 69 includes an annular ring 70 having flange portions 71 and 72 which are connected by pins 73 and 74 to the outermost ends of piston rods 75 and 76. Piston rods 75 and 76 are connected at their innermost ends to opposite sides of a piston 77 disposed within a cylinder 78. Cylinder 78 may be mounted for rotational movement in a manner equivalent to that in which the cylinder 22 is so mounted. Thus, cylinder 78 may be supported by a sleeve 79 which has a spindle portion 80 extending through the housing wall 5. As shown in FIGURE 9, spindle 80 may be secured within the wall 5 by a snap ring 37 and a handle plate 35 corresponding to the same-numbered components of the actuator assembly 21. An O-ring 41 and seal and friction-reducing gaskets 43 may be employed as shown in FIGURE 9 in a manner equivalent to that in which they are employed in the actuator assembly 21.

Piston 77 has an outer diameter somewhat less than the inner diameter of the cylinder 78 so as to define a restricted, annular passage 81. Cylinder heads 82 and 83, which may be fabricated of a sealing and friction-reducing material such as Teflon, may be utilized to close the ends of the cylinder 78 as illustrated in FIGURE 8. Conventional lock rings 84 and 85 may be used to prevent movement of the cylinder heads 82 and 83 out of their installed positions. Flange portions 86 and 87, formed respectively on cylinder heads 82 and 83, may serve to prevent inward movement of the cylinder heads with reference to the cylinder 78.

An annular, hardened mass 88 of fusible material may be disposed on one side of piston 77 within the cylinder 78. With the arrangement shown in FIGURE 8 the hardened mass 88 may be dimensioned so as to secure the piston 77 substantially against the piston head 83.

The piston 77, in cooperation with the cylinder 78, defines a first cylinder cavity 89, a restricted passage 81, and a second cylinder cavity 90. In referring to the cylinder cavity 89, this term is applied to the interior of the cylinder on the side of the piston 77 adjacent the cylinder head 82. Similarly, the second cylinder cavity 90 refers to the interior of the cylinder between the piston 77 and the cylinder head 83. As will be apparent, with the piston 77 disposed at either end of its travel range, one of the cylinder cavities will be of virtually negligible size. However, as the piston 77 moves within the cylinder 78, this cavity will progressively enlarge while the other cavity will progressively diminsh in size.

With the actuator components positioned as shown in FIGURE 8 so that the hardened, fusible mass 88 is disposed between the restricted passage 81 and the rod 19, with the rod end 20 engaging the outer periphery of the ring 70, the ring 70 is displaced to its maximum extent away from the fluid inlet passage 11 so as to allow the closing of the valve 14. By rotating the assembly 180° so as to position the restricted passage 81 between the fusible mass 88 and the rod 19, the ring 70 will be displaced toward the rod 19 so as to move the valve 14 away from the valve 16 and allow an inflow of fluid into the housing cavity.

When water passing through the cavity 6 attains a predetermined temperature, the mass 88 will melt and become liquid. The biasing force exerted by the rod 19 against the ring 70 will be transmitted to the piston 77. The piston 77 will then tend to move away from the inlet 11 so as to cause the melted material to move through the axially translating passage 81, i.e., around the periphery of the piston 77, into the cylinder cavity 90. When the melted material has resolidified within the cavity 90, the actuator assembly may be again rotated 180° to effect the resetting of the assembly and thus reopening of the valve 14.

The actuator device of this invention finds particular utility and affords maximum advantages when employed as a flow control device as described with reference to FIGURES 1 through 9. However, certain limited advantages of the invention may be derived by utilizing the piston and cylinder embodiment, shown in FIGURES 4 through 7 or in FIGURES 8 and 9, without the associated yoke mechanism, which serves to engage piston means at opposite ends of the cylinder in which the piston means is mounted. Thus, as shown in FIGURE 10, the cylinder 78 and piston 77 with the projecting piston rods 75 and 76 may be utilized to control the actuation of a device such as the schematically illustrated, electrical switch 91 in response to ambient air temperature conditions.

Figure 10:
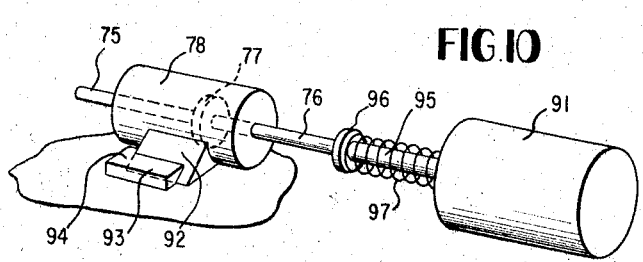
FIGURE 10 is a perspective and schematic illustration of a still different manner in which components of the invention may be employed as a thermally responsive actuator device.

As shown in FIGURE 10, the cylinder 78 may include a dove-tailed mounting plate 92 adapted to be slidably received within a dove-tailed slot 93. Movement of the dove-tailed base 92 within the slot 93 is limited by means such as the abutment 94.

An operating rod 95 having an enlarged end 96 may extend from a conventional operating mechanism, not shown, combined within the switch 91. A coil spring 97 may be associated with the operating rod 95 and engaged with the enlarged rod end 96 so as to bias the rod toward the cylinder 78.

By functioning in response to ambient air temperature conditions in a manner corresponding to that in which the piston 77 and cylinder 78 assembly functioned in actuator assembly 69, a thermally responsive movement of switch-operating rod 95 will be obtained.

After the rod 95 has moved toward the cylinder 78 in response to a temperature rise sufficient to cause the melting of the fusible mass contained in this cylinder, the switch may be reset by reversing the position of the cylinder 78 180°. This cylinder reversal may be accomplished by moving the rod 95 toward the switch 91, removing the dove-tailed base 92 from the dove-tailed slot 93, reversing the cylinder 180°, reinserting the dove-tailed base 92 into the slot 93, and releasing the rod 95 to allow it to engage the piston rod 75.

As will be apparent, the actuator arrangement shown in FIGURE 10 incorporates advantages of the invention which may be attributed to the multiple cavity, cylinder and piston arrangements wherein the cylinder is mounted so as to allow a reorientation of the assembly relative to associated operating means.

The overall assemblies featured in FIGURES 1 through 9 afford particularly unique advantages.

Both embodiments of the apparatus shown in FIGURES 1 through 9 enable an actuator assembly to be fully immersed within a liquid so as to reliably control the flow of the liquid in response to its temperature. Even though the actuator assembly is fully immersed, it may be conveniently manipulated externally of the housing in which it is contained.

It should be noted that the fusible mass incorporated in each actuator assembly is held in compression by apparatus operating means prior to the melting of this mass. With this arrangement, and with the mass being effectively confined, failure tendencies due to metallic creep and fatigue are virtually eliminated. Thus, it is insured that the actuator assembly will consistently and reliably function in response to a predetermined ambient temperature condition, as governed by the melting point of the fusible mass.

A particularly unique and advantageous feature of the invention resides in the described yoke assembly which serves to engage the disclosed piston means at opposite ends of associated cylinder means. Such yoke means, including the described annular ring engaged by an operating rod, enable resetting to be accomplished with minimum effort but consistent reliability and maximum ease.

The overall simplicity of the device, in addition to insuring minimum maintenance and prolonged operating life, minimizes initial fabrication costs.

Not to be overlooked is the unique sealing arrangement by means of which the cylinder-supporting spindles are journaled within their respective housings.

While the invention has been described with reference to certain preferred embodiments, those skilled in the art and having the benefit of the disclosure of this invention may recognize certain additions, deletions, modifications, substitutions, and additional applications with respect to the apparatus embodiments shown in the application drawings. The overall scope of the invention, which would encompass such variations, is deemed to be defined in the appended claims.

I claim:
1. A thermal-responsive actuator apparatus comprising:
an assembly including,
   cylinder means, and
   piston means slidably mounted in said cylinder means;
      said cylinder means and piston means defining
         a first variable size cavity and
         a second variable size cavity coaxially aligned with said first variable sized cavity, and
         restricted passage means interposed axially and providing communication between the outermost axial extremities of said first and second cavities;
a mass of solidified, fusible material supported within said cylinder means in one of said cavities;
operating means operatively associated with said piston means so as to cause said piston means to compressively engage said mass of fusible material; and
mounting means supporting said cylinder means whereby, when said mass has melted and become liquid in response to an ambient temperature rise and the thus-formed liquid has at least in part moved from one of said cavities, through the restricted passage means into the other of said cavities and resolidified therein, the cylinder means and piston means assembly may be reoriented to cause the piston means to compressively engage the resolidified mass in the other of said cavities.

2. An apparatus as described in claim 1 including yoke means connected to said piston means and engaging said piston means at opposite ends of said cylinder means;
said operating means being adapted to engage said yoke means so as to transmit biasing force, through said piston means, tending to compress said mass; and
said mounting means including a spindle connected with said cylinder means and supporting said cylinder means for rotation about an axis transverse to the longitudinal axis of said cylinder means.

3. An apparatus as described in claim 2 wherein:
said yoke means includes an annular, cylindrical ring encircling said assembly of said cylinder means and piston means, and connected with said piston means; and
said operating means includes a spring-biased operating rod resiliently urged toward and engaging the outer periphery of said annular ring so as to tend to urge the engaged portion of said ring toward said cylinder means.

4. An apparatus as described in claim 3 wherein:
said cylinder means comprises a cylindrical wall and a transverse, axially apertured wall extending across a mid-portion of said cylindrical wall; and said piston means comprises first and second pistons with said first piston being mounted within said cylindrical wall on one side of said transverse wall and with said second piston being mounted within said cylindrical wall on the other side of said transverse wall;

said transverse, axially apertured wall defining said restricted passage means.

5. An apparatus as described in claim 3 wherein:
said cylinder means comprises a cylindrical wall; and said piston means comprises a piston disposed at an intermediate point within said cylindrical wall and further includes first and second piston rods extending axially of said cylindrical wall in opposite directions from said piston;
said piston having an outer periphery spaced from the inner periphery of said cylindrical wall so as to define said restricted passage means.

6. An apparatus as described in claim 3 wherein:
said mounting means further includes a housing in which said spindle is journaled for rotational movement;
said housing includes a central cavity containing said cylinder means and piston means assembly;
said housing further includes a fluid inlet and a fluid outlet, with said inlet and outlet being disposed on opposite sides of said central cavity;
said apparatus further includes a check valve mounted in said fluid inlet and spring-biased toward said central cavity; and
said operating means comprises a rod extending from said spring-biased check valve and slidably engaging the outer periphery of said annular ring;
said cylinder and piston assembly being adapted to be oriented so as to cause said annular ring to be so disposed as to hold said rod in a position supporting said spring-biased valve in an open position.

7. A thermal responsive, liquid flow control apparatus comprising:
a housing including a cylindrical wall and axially spaced, radially extending, transverse walls cooperating to define a central cavity;
said housing further including a fluid inlet and a fluid outlet, said fluid inlet and said fluid outlet being coaxially aligned and disposed on opposite sides of said central cavity and intersecting said cylindrical wall;
a cylinder;
means for supporting said cylinder for rotation within said central cavity generally about the axis of said cylindrical wall, said means including a sleeve peripherally embracing said cylinder and a spindle extending radially from said sleeve, and journaled within one of said radially extending walls of said housing, said means further including manually operable handle means connected with said spindle externally of said housing whereby said spindle may be rotated;
an assembly including
    piston means slidably mounted in said cylinder;
        said cylinder and piston means defining
            a first variable size cavity and
            a second variable size cavity coaxially aligned with said first variable size cavity, and
            restricted passage means interposed axially and providing communication between the outermost axial extremities of said first and second cavities;
a mass of solidified, fusible material supported within said cylinder in one of said cavities;
a spring-biased check valve mounted in said inlet of said housing and biased toward the central cavity thereof;
a rod extending from said valve toward and into the interior of said central cavity, said rod being generally coaxially aligned with said inlet and said outlet; and
a yoke operably engaged with said piston means at opposite ends of said cylinder, said yoke including an annular, cylindrical ring encircling said cylinder and piston means assembly with its axis generally paralleling the axis of said cylindrical wall of said housing, said yoke further including connecting means extending between the inner surface of said annular ring and said piston means and being mounted for movement with said piston means generally radially of said cylindrical wall of said housing;
said cylinder, when oriented such that its axis extends parallel to the axis of said inlet and said outlet, being adapted to position said annular ring so as to maintain said rod in a position holding said check valve open.

8. A thermal responsive actuator apparatus comprising:
an assembly including
    cylinder means, and
    piston means slidably mounted in said cylinder means;
        said cylinder means and piston means defining
            a first variable size cavity portion, and
            a second variable size cavity portion,
            passage means interposed and providing communication between said first and second cavity portions;
a mass of solidified, fusible material supported within one of said variable size cavity portions;
operating means operatively associated with said piston means so as to cause one portion of said piston means to compressively engage said mass of fusible material; and
mounting means supporting said assembly whereby, when said mass has melted and become liquid in response to an ambient temperature rise and the thus formed liquid has at least in part moved from said one of said cavity portions to the other of said cavity portions and resolidified therein, other portions of said piston means may be caused to compressively engage the solidified mass in the other of said cavity portions.

References Cited by the Examiner
UNITED STATES PATENTS

| | | | |
|---|---|---|---|
| 1,114,166 | 10/1914 | McNutt | 137—77 X |
| 1,386,525 | 8/1921 | Oca-Balda et al. | 200—124 X |
| 1,974,257 | 9/1934 | Brandt | 200—124 |

WILLIAM F. O'DEA, *Primary Examiner.*

R. GERARD, *Examiner.*